United States Patent [19]

Leininger

[11] Patent Number: 4,678,922
[45] Date of Patent: Jul. 7, 1987

[54] AIR MOTOR HAVING INTEGRAL GENERATOR

[76] Inventor: Jon J. Leininger, P.O. Box 12, DePere, Wis. 54115

[21] Appl. No.: 792,821

[22] Filed: Dec. 5, 1985

[51] Int. Cl.$^4$ ............................................ F03B 13/00
[52] U.S. Cl. ........................................ 290/54; 290/43; 15/28
[58] Field of Search ............................. 290/54, 43, 52

[56] References Cited

U.S. PATENT DOCUMENTS

| | | | |
|---|---|---|---|
| 2,097,166 | 10/1937 | Stone | 219/296 |
| 3,342,267 | 9/1967 | Cotter et al. | 219/296 |
| 4,208,592 | 6/1980 | Leibow et al. | 290/52 |
| 4,369,373 | 1/1983 | Wiseman | 219/296 |

FOREIGN PATENT DOCUMENTS

| | | | |
|---|---|---|---|
| 479148 | 7/1929 | Fed. Rep. of Germany | 219/296 |
| 530344 | 12/1921 | France | 219/296 |

*Primary Examiner*—Bernard Roskoski
*Attorney, Agent, or Firm*—Nicholas A. Kees; James E. Nilles

[57] ABSTRACT

A tool driven by air or some other non-conductive pressurized fluid, which tool incorporates a generator for powering a lamp and providing a good source of light in the work area. Batteries and a charging circuit may also be supplied for storing excess electricity from the generator so that the lamp can be used even when the tool is not running. In all embodiments disclosed herein, the air cylinder of the motor of the air tool is redone to accept a coil which is electrically connected to the lamp, while permanent magnets turn with the rotor of the air motor. In one embodiment the permanent magnets are embedded in the rotor itself. In another embodiment the vanes of the rotor are manufactured from a permanently magnetic material, and constitute the magnets. In a third embodiment highly magnetic bits, such as rare earth cobalt, are embedded in concentrated areas in the vanes, and these bits create a sufficient magnetic field to cause current to flow in the coil when the rotor is turning. In a fourth embodiment a polarized ceramic rotor magnet is attached to the rotor to cause a current in the coil while the rotor turns. In a fifth embodiment a single pole arrangement is employed. That is, several small coils are embedded in one of the bearing end plates, while a magnet rotor, attached to the rotor of the air motor, carries magnets in facing relationship to the coils. In all embodiments, as the magnets move with respect to the coils, current is generated in the coils, which current is used as described above.

8 Claims, 8 Drawing Figures

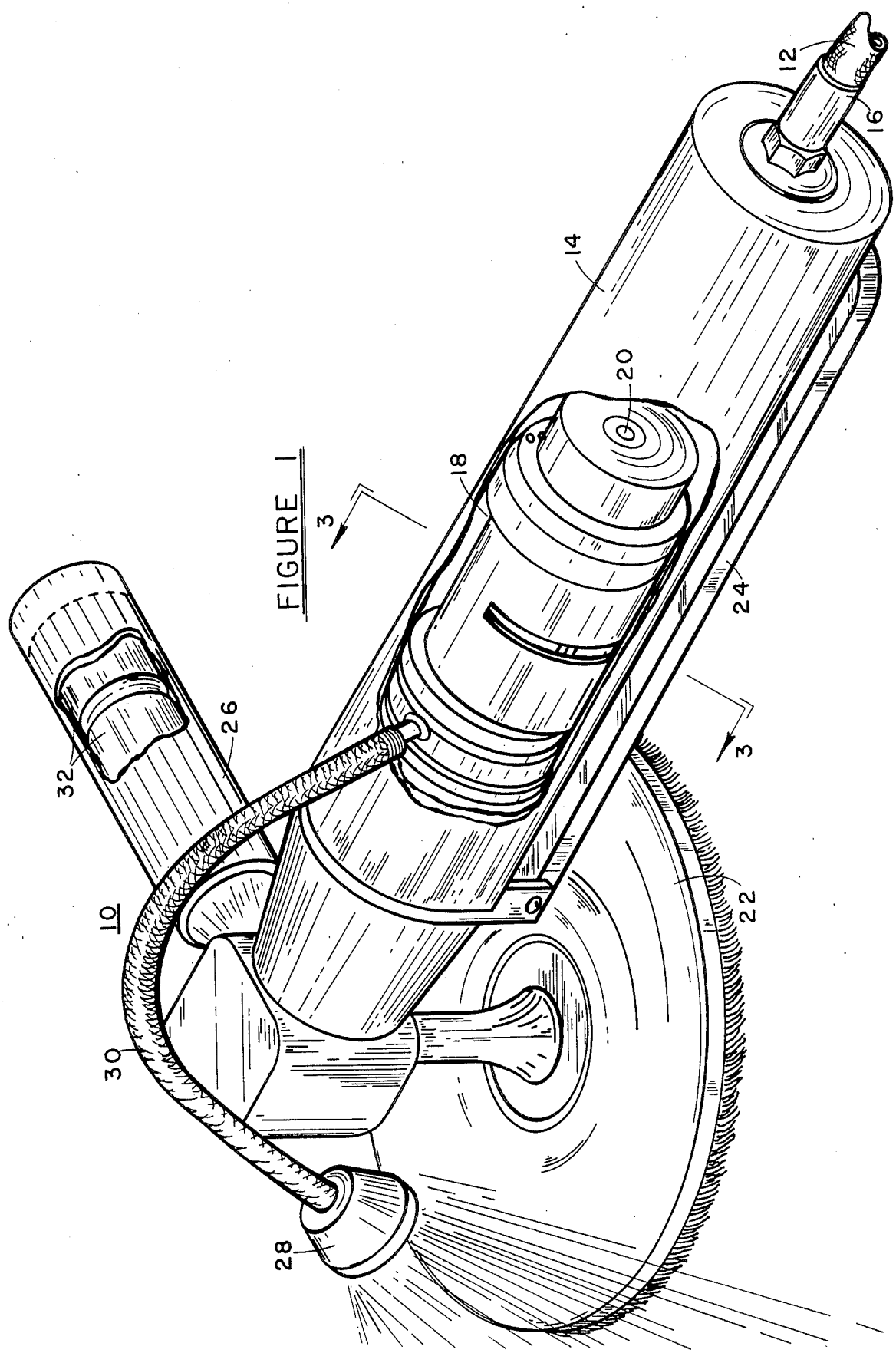

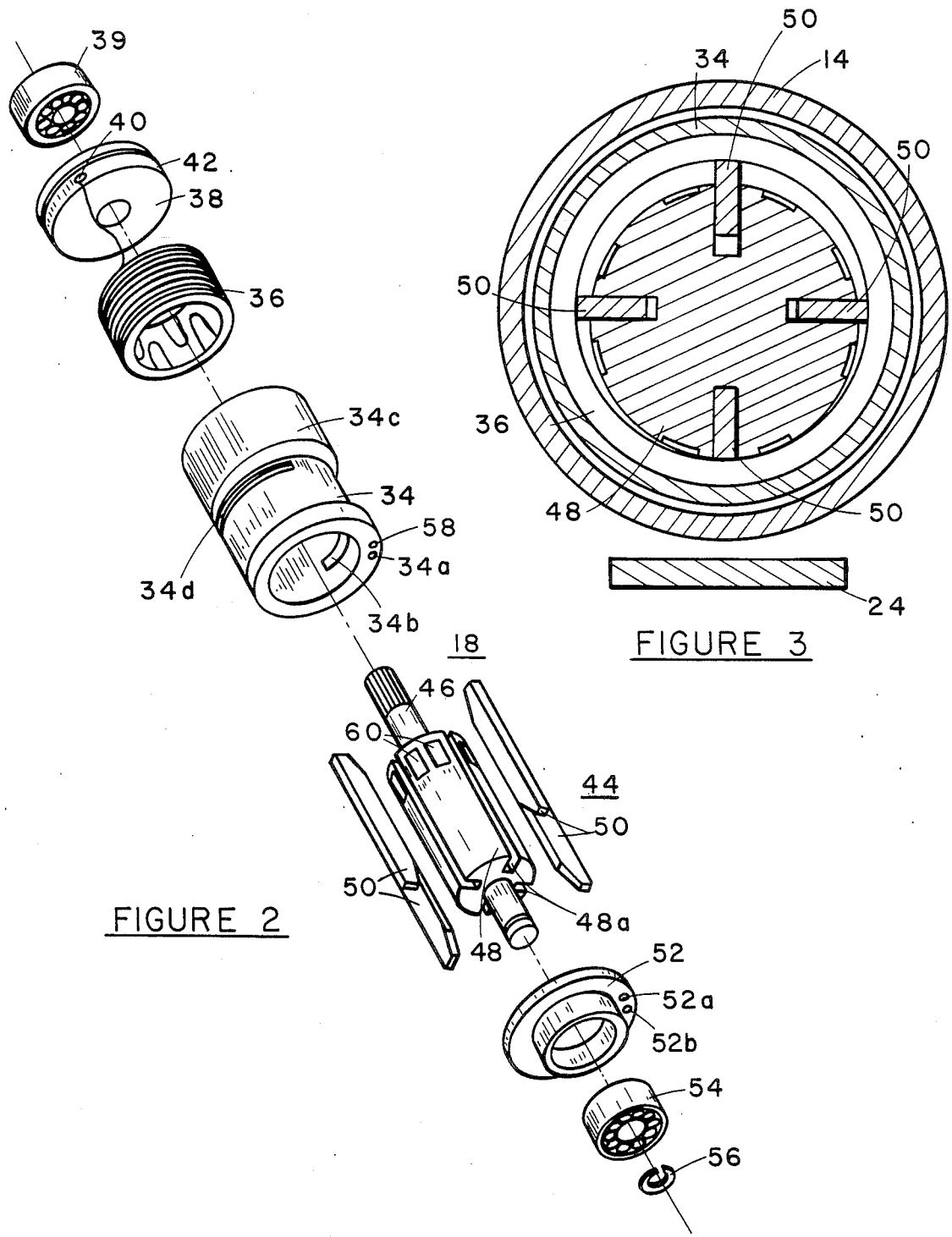

AIR MOTOR HAVING INTEGRAL GENERATOR

BACKGROUND OF THE INVENTION

This invention relates to air tools and other non-electric tools having motors driven by non-conducting fluids underpressure, and in particular to such tools having light sources integrated therewith.

It is commonly known that wherever air tools and other non-electric tools are used, it is difficult to maintain adequate lighting on the workpiece. A discrete lighting fixture such as a trouble light can get in the way of the work, and requires a separate means of attachment or support to properly illuminate the work. Moreover, a lamp attached to the tool and conventionally connected to a source of electric power would require a separate cord, and add further weight and reduce the mobility of the operator to a greater degree than if the air hose alone were connected to the tool.

Another method of illuminating the work when using an air tool may be to add a battery pack, so that the lamp is battery powered. Here one disadvantage is that the battery pack adds weight and makes it more difficult and tiring for the operator to wield the air tool. Further, batteries have a limited charge life, after which they must be recharged or replaced.

This invention relates to improvements over the devices described above and to solutions to the problems raised thereby.

SUMMARY OF THE INVENTION

The invention includes an air motor as is conventionally used in air tools such as grinders and air ratchets. In each of the preferred embodiments, a generator of electric current, whether alternating or direct, is fashioned integrally within the air motor. While the invention is intended to include any device wherein a generator is formed integrally within an air motor, all of the preferred embodiments include one or more coils placed within the air cylinder housing. In one embodiment the air vanes themselves are made of a permanently magnetic material such as alnico such that as the air vanes and rotor are turned by the air pressure, a current is generated in the coil or coils. In another embodiment, permanent magnets are imbedded in the rotor body to generate the current. In a third embodiment tiny high-powered permanent magnets are manufactured into the vanes themselves to generate the current. In a fourth embodiment, a polarized ceramic rotor magnet is attached to the rotor to cause a current in the coil as it turns. In a fifth embodiment a side-pole arrangement is used. In each embodiment, then, a lamp is connected to the casing via a gooseneck arrangement, and electrically connected to the coil or coils, so as to flexibly and accurately provide light to the work area. An integral rechargeable battery may be provided, along with a charging circuit, to provide light even when the tool is not turning, at least on a short term basis, such as when employing an air ratchet to tighten or loosen a threaded fastener.

It is then an object of the invention to provide an air tool having an electric generator integrally formed in the air motor thereof for conveniently providing light to the work area.

Another object of the invention is to provide an air tool having an integral electric generator and a device for storing electrical energy for conveniently providing light to a work area whether or not the air tool is running.

A more specific object of the invention is to provide an air tool having an air motor with a rotor driven by vanes, wherein a field coil is built into the air cylinder of the motor and wherein the rotor or vanes include magnetic material for causing a current to flow in the coil.

Another specific object of the invention is to provide an air tool having an integral electric generator and having rechargeable batteries and a charging circuit for conveniently providing light to a work area whether or not the air tool is running.

Other objects and advantages of the invention will become apparent hereinafter.

DESCRIPTION OF THE DRAWING

FIG. 1 is an isometric view of an air tool embodying the invention.

FIG. 2 is an exploded view of an air motor showing one embodiment of the invention.

FIG. 3 is a sectional view of the tool shown in FIG. 1 taken along line 3—3.

DESCRIPTION OF THE PREFERRED EMBODIMENTS

Figures 4, 5:
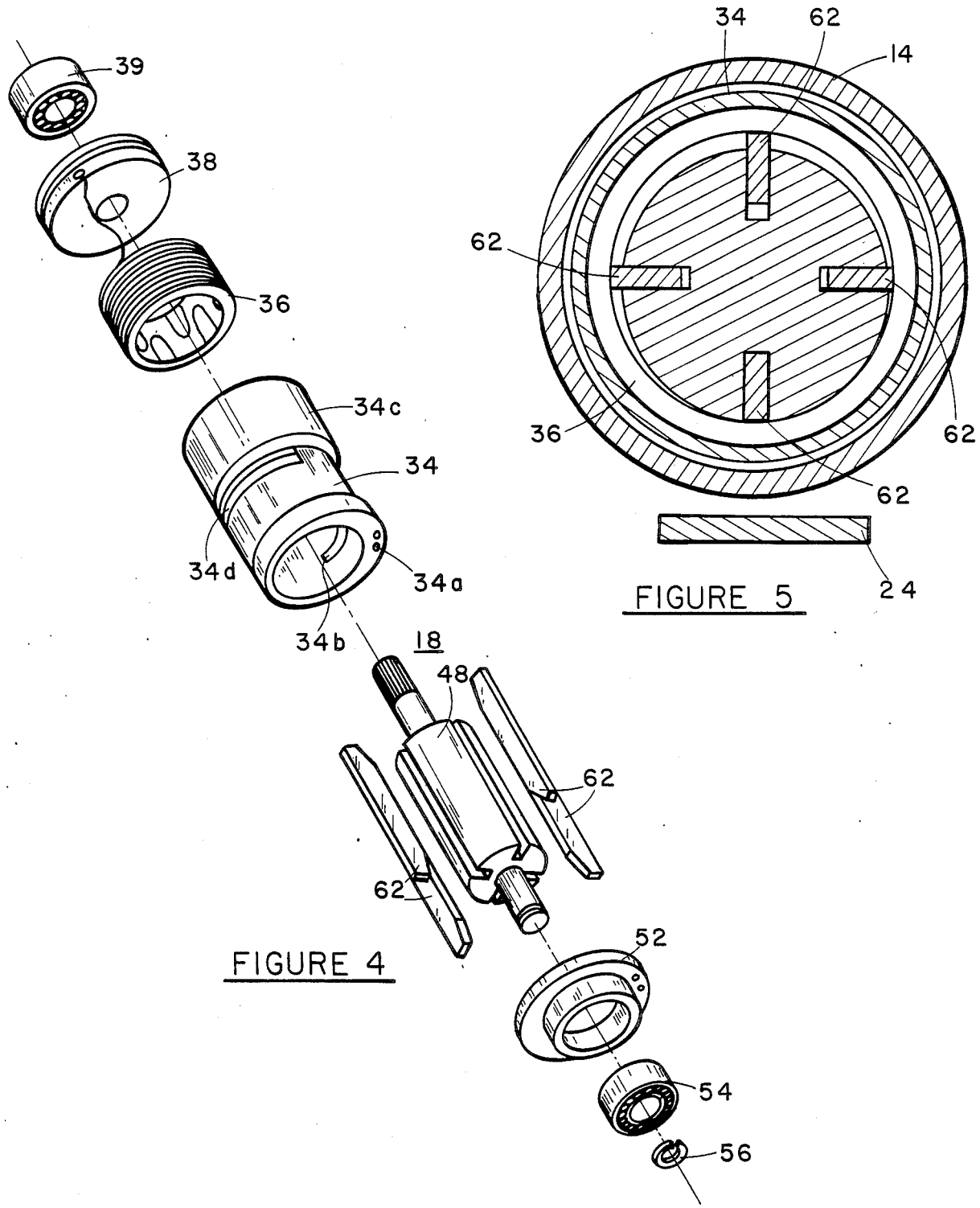
FIG. 4 is an exploded view of an air motor showing another embodiment of the invention.
FIG. 5 is a sectional view, similar to FIG. 3, of the embodiment shown in FIG. 4.

Referring now to FIG. 1, there is shown an air tool, whether buffer, polisher, sander or grinder, designated generally at 10. Tool 10 is connected to a conventional hose 12 which is in turn connected to a source of compressed air (not shown). Hose 12 is connected to the conventional casing 14 of tool 10, preferably via an airtight fitting 16. As is conventional in air tools, the compressed air passes through an air motor, indicated generally at 18. There it causes a shaft 20 to rotate, which in turn spins a disk 22 or other tool to accomplish the intended work. Flow of the air may be controlled by a valve (not shown) which in turn may be controlled by a lever 24, accessible to the operator and connected to casing 14. Another handle 26 may also be applied to casing 14 to help the operator securely hold and apply force with the tool 10.

Within air motor 18, as will be explained in more detail presently, is a coil-and-rotor-magnet generator arrangement such that as the rotor of the air motor 18 is turned by the air pressure, an electric current is generated. A lamp 28 is electrically connected to the generator to provide light to the work area. Lamp 28 is also physically connected to the casing 14 of the tool. This connection may be a gooseneck arrangement 30 to facilitate proper placement of the light provided by the lamp 28 upon the work area. In addition, a set of rechargeable batteries 32 may be placed in a suitable location, such as within handle 26, and supplied with a conventional charging circuit connecting them to the generator inside the air motor such that the batteries can be charged when the air motor is running. The lamp 28 can then be powered by the batteries 32 even when the air motor is not turning. This arrangement would be particularly useful where the air motor may be used intermittently, such as when driving an air wrench, or where the air tool is being used where general lighting may be poor and visibility diminished by goggles or visors, such as in mining, shipbuilding, or in foundries.

The improved air motor 18 is shown in more detail in FIGS. 2 and 3. FIG. 2 is an exploded view of the air motor 18 showing its relevant parts. The air chamber 34 is mostly conventional, having an air inlet 34a by which compressed air is allowed to enter under the control of the operator as described above. It also has a conventional air outlet slot 34b to allow the compressed air to impact on the fins as described below. Air escape slot 34d then allows the compressed air to escape after use. The only unconventional feature of the air chamber 34 is that the end 34c of the chamber opposite the air inlet 34a is enlarged to accommodate the insertion of a coil 36 therein. After insertion, coil 36 may then be held in position with an end plate 38 containing a bearing 39. A contact terminal 40 is electrically connected to the coil 36, and may be mechanically attached to bearing end plate 38 via an insulating ring 42 surrounding part of the end plate. Contact terminal 40 is then electrically connected to lamp 28 as described above with respect to FIG. 1.

Referring again to FIGS. 2 and 3, a rotor assembly 44 completes the air motor 18. THe rotor assembly 44 includes a shaft 46 formed integrally with a rotor body 48. A plurality of slots 48a are formed lengthwise in body 48, to accommodate the sliding insertion of a number of air vanes 50. The reason for the sliding requirement will be explained presently. One end of shaft 46 may be splined to accept engagement with the driven portions (not shown) of the air tool 10. To the opposite end of shaft 46 is affixed a bearing end plate 52, a bearing 54 and a retaining ring 56 so that the shaft 46 and rotor body 48 can rotate freely with respect to plates 38 and 52. The plate 52 is then secured to the air chamber 34 as shown by suitable means, such as a peg 58 attached to air chamber 34 and fitting into an aperture 52a formed for that purpose in plate 52, so that a hole 52b in end plate 52 aligns with inlet 34a to allow free passage of air. The reason that the vanes 50 are slideable within slots 48a can be seen by reference to FIG. 3. It can there be seen that rotor assembly 44 is eccentric with respect to the inside of air chamber 34. As the rotor body 48 spins, vanes 50 slide out of slots 48a until they contact the inside of air chamber 34 or coil 36. They also may preferably be biased outward by biasing devices (not shown) so that the air pressure can impact on the vanes 50 and cause rotor 48 to begin to run even when it had not been already turning.

In the embodiment shown in FIGS. 2 and 3, the generator within air motor 18 includes a plurality of permanent magnets 60 embedded in rotor body 48. Then, after the rotor body 48 is assembled into the air chamber 34 and begins turning, the movement of magnets 60 and their associated magnetic fields causes a current to flow in coil 36. In turn a current flows to lamp 28 to make it give off light, or the current may flow to batteries 32 to charge them for future use in connection with lamp 28, or both.

Another embodiment of the invention is shown in FIGS. 4 and 5. In this embodiment there are no permanent magnets embedded in the rotor body 48. Rather, the vanes 62 are made of a permanently magnetic material, such as hard rubber. The effect is similar. As vanes 62 move with respect to coil 36, a current is generated in the coil. This current is employed exactly as described above with respect to the embodiment shown in FIGS. 2 and 3.

Figure 6:
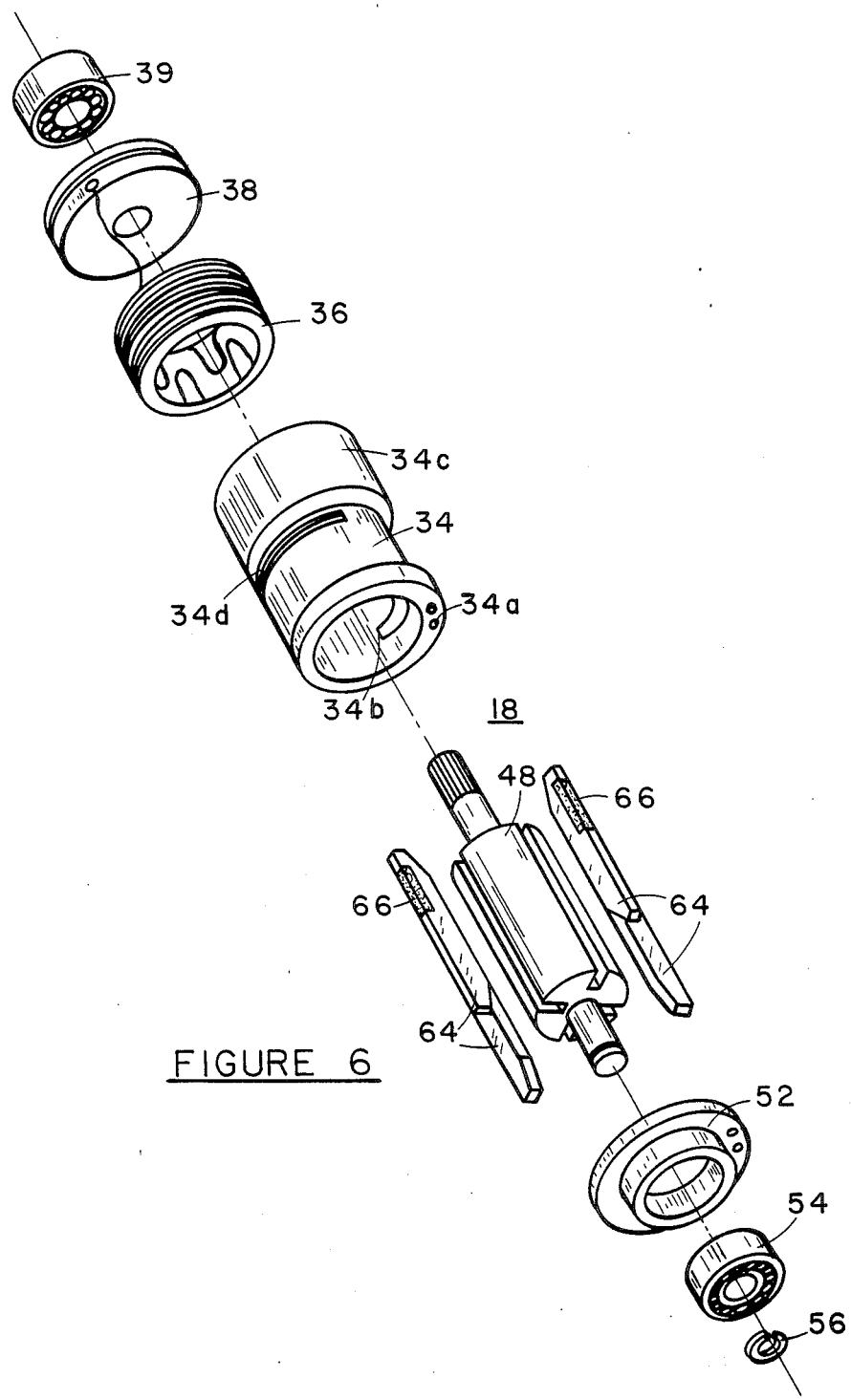
FIG. 6 is an exploded view of an air motor showing yet another embodiment of the invention.

A third embodiment of the invention is shown in FIG. 6. Again in this embodiment there are no permanent magnets embedded in rotor body 48. Further, the vanes 64 themselves are made of conventional, non-magnetic material. Bits of highly permanently magnetic material 66 are embedded into the material of the vanes 64 integrally during the manufacture of the vanes, at a concentrated location arranged to align with the coil 36 upon assembly. Again the effect is the same as that described with respect to the previous two embodiments. As vanes 64 and magnetic bits 66 move with respect to coil 36, a current is generated in the coil, which current is used as described above.

Figure 7:
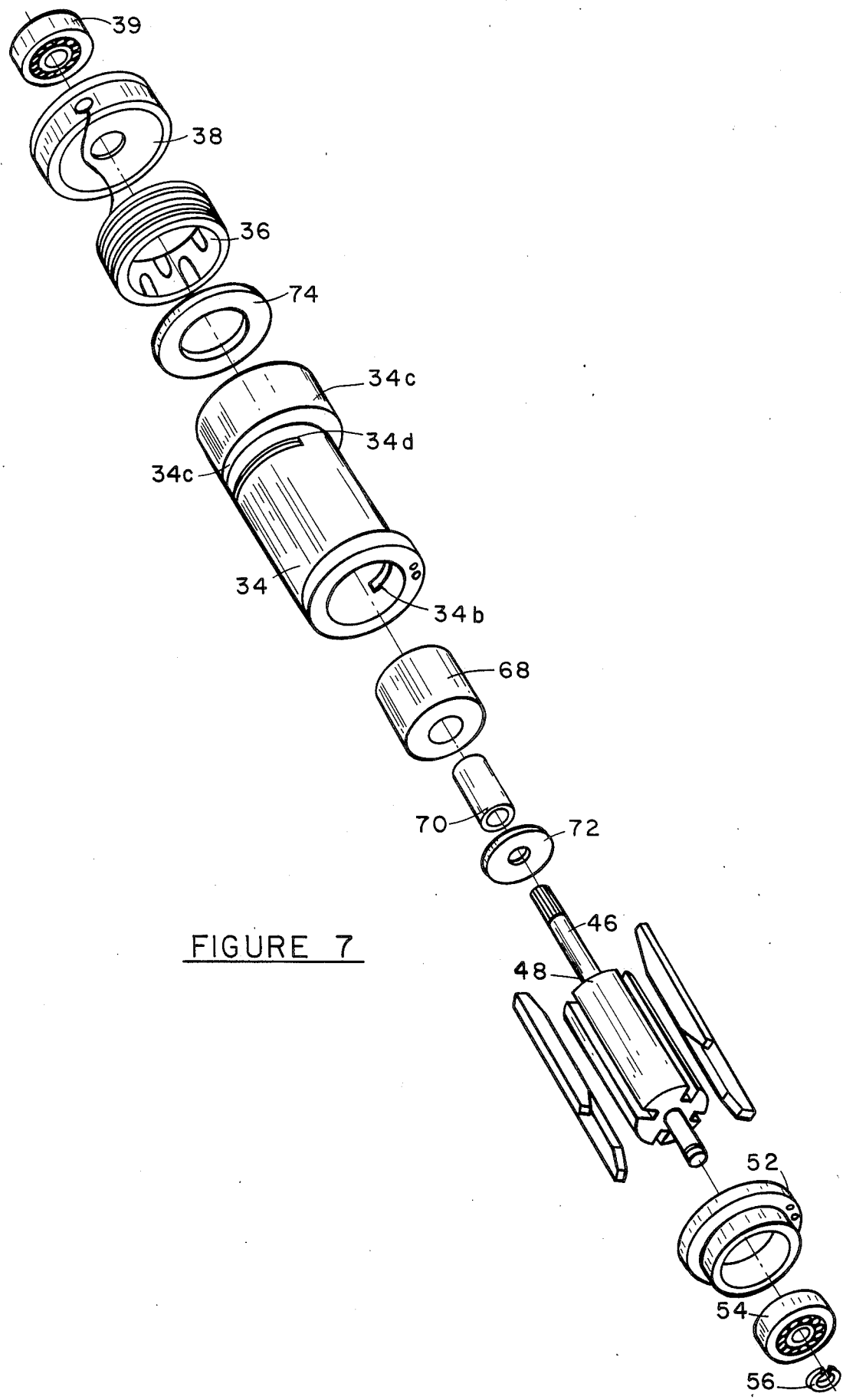
FIG. 7 is an exploded view of an air motor showing a fourth embodiment of the invention.

A fourth embodiment of the invention is shown in FIG. 7. In this embodiment a polarized ceramic rotor magnet 68 is pressed onto rotor shaft 46 after installation thereon of a sleeve insulator 70 and end insulator 72. Since the purpose of these insulators is to insulate from magnetism rather than electricity, they may be of any suitable magnetically insulating material, such as brass. Also in this embodiment a chamber divider 74 is installed, preferably by press fitting, at the near end 34e of enlarged portion 34c of the air chamber 34 to prevent or at least reduce leakage of air into the area of the coil 36, since any such leakage would reduce the amount of air turning rotor shaft 46. The effect of ceramic magnet 68 is the same. Since it has a plurality of poles spaced about its periphery, as it turns within coil 36 it causes a current therein, which current is used as described.

Figure 8:
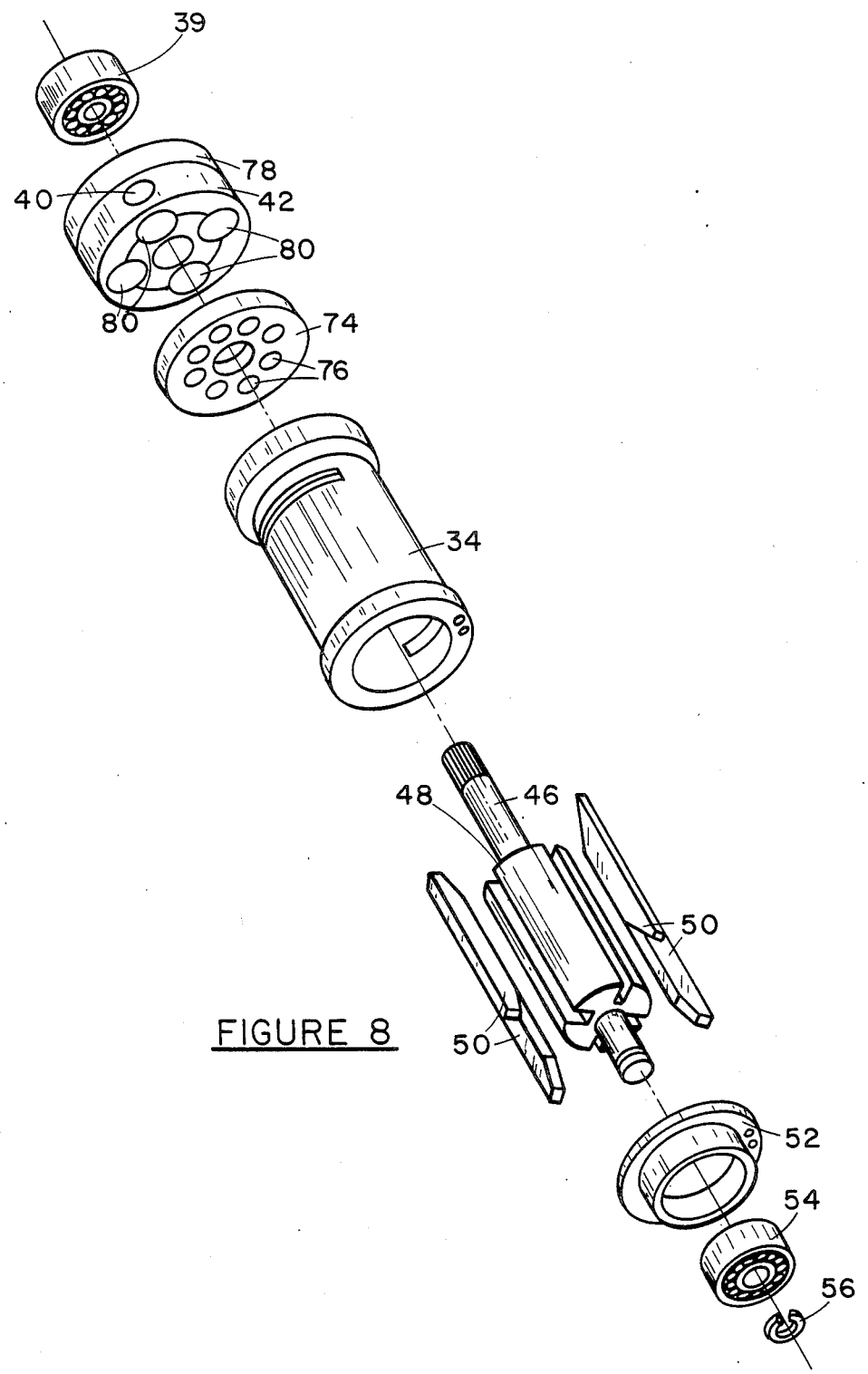
FIG. 8 is an exploded view of an air motor showing a fifth embodiment of the invention.

Finally, a fifth embodiment of the invention is shown in FIG. 8. This embodiment is different from the others in that it employs a side-pole arrangement in its generator. Here again, as in the embodiment shown in FIG. 7, there are no magnets located on the rotor shaft 46, body 48 or fins 50. In this embodiment a magnet rotor 74 is attached to rotor shaft 46 after the rotor is inserted in chamber 34. Magnet rotor 74 holds a plurality of magnets 76 spaced about its periphery. A different bearing end plate 78 is used to align and hold rotor shaft 46. This bearing end plate 78 has a plurality of coils 80 located in facing relationship to magnet rotor 74. Hence as the rotor shaft 46 is turned by air pressure, magnets 76 move past coils 80 causing current to flow in the coils. This current is used as described above.

While the apparatus hereinbefore described is effectively adapted to fulfill the aforesaid objects, it is to be understood that the invention is not intended to be limited to the particular preferred embodiments of combination air motor and generator herein set forth. Rather, the invention is to be taken as including various equivalents without departing from the scope of the appended claims.

What is claimed is:
1. An improved air tool, comprising:
   A. a tool housing having a closed outer wall;
   B. a motor for powering the tool positioned within said housing, including:
      1. a rotor assembly comprising:
         a. a shaft mounted for rotation within said housing; and
         b. a rotor body affixed to said shaft; and
         c. a plurality of vanes connected to said rotor body;
      2. means integrally formed in said housing for allowing compressed air to enter and for directing said compressed air against said vanes thereby causing said rotor assembly to rotate by the force of compressed air against said vanes;

C. generator means comprising a stator positioned within said housing coaxially with said rotor assembly, said rotor assembly having magnetic means for cooperating with said stator and thereby generating electrical energy for powering an electrical appliance connected to the tool while said rotor assembly is rotated by said compressed air.

2. An improved tool as recited in claim 1 wherein said electrical appliance comprises a lamp, electrically connected to said generator means.

3. An improved tool as recited in claim 2 further comprising: storage means for storing any excess electrical energy generated by said generating means over that used by said lamp, such that said lamp may provide light even when said rotor assembly is not rotated.

4. An improved tool as recited in claim 1
wherein said cooperating magnetic means of said rotor assembly includes a plurality of permanent magnets embedded in said rotor body.

5. An improved tool as recited in claim 1
wherein said cooperating magnetic means of said rotor assembly includes said vanes being made of a permanently magnetic material.

6. An improved tool as recited in claim 1
wherein said cooperating magnetic means of said rotor assembly includes permanently magnetic bits manufactured into certain concentrated areas of said vanes.

7. An improved tool as recited in claim 1
wherein said cooperating magnetic means of said rotor assembly includes a polarized ceramic rotor magnet affixed to said shaft adjacent said rotor body and aligned with said coil.

8. An improved tool as recited in claim 1 wherein said shaft is mounted for rotation within said housing by means of bearings and positioned by bearing end plates; and
wherein said stator includes a plurality of coils located in said bearing end plates and said cooperating magnetic means of said rotor assembly includes magnets held in a magnet rotor affixed to said shaft such that the magnets are held in facing relationship to said coils.

* * * * *